US012673899B2

(12) United States Patent
Karagüler et al.

(10) Patent No.: US 12,673,899 B2
(45) Date of Patent: Jul. 7, 2026

(54) MOISTURE REGULATING MATERIAL AND PRODUCTION METHOD THEREOF

(71) Applicant: KALESERAMIK ÇANAKKALE KALEBODUR SERAMIK SANAYI ANONIM SIRKETI, Çan (TR)

(72) Inventors: Nevin Gül Karagüler, Istanbul (TR); Hande Mumcu, Istanbul (TR); Yildiz Yildirim, Çan (TR); Elif Solak, Çan (TR); Kagan Kayaci, Çan (TR); Erdem Günsür, Besiktas (TR)

( * ) Notice: Subject to any disclaimer, the term of this patent is extended or adjusted under 35 U.S.C. 154(b) by 726 days.

(21) Appl. No.: 18/004,080

(22) PCT Filed: Jun. 23, 2021

(86) PCT No.: PCT/TR2021/050643
§ 371 (c)(1),
(2) Date: Jan. 3, 2023

(87) PCT Pub. No.: WO2022/005432
PCT Pub. Date: Jan. 6, 2022

(65) Prior Publication Data
US 2023/0303447 A1 Sep. 28, 2023

(30) Foreign Application Priority Data
Jul. 2, 2020 (TR) ................................. 2020/10490

(51) Int. Cl.
*C04B 33/20* (2006.01)

(52) U.S. Cl.
CPC ...... *C04B 33/20* (2013.01); *C04B 2235/3409* (2013.01); *C04B 2235/349* (2013.01); *C04B*

*2235/448* (2013.01); *C04B 2235/6567* (2013.01); *C04B 2235/6588* (2013.01)

(58) Field of Classification Search
CPC ................................................. B01J 2220/4806
See application file for complete search history.

(56) References Cited

U.S. PATENT DOCUMENTS

| | | | |
|---|---|---|---|
| 6,472,061 | B2 | 10/2002 | Kotama et al. |
| 2005/0005870 | A1 | 1/2005 | Fritter et al. |
| 2019/0223445 | A1 | 7/2019 | Seo et al. |

FOREIGN PATENT DOCUMENTS

| | | |
|---|---|---|
| JP | 2008254939 A | 10/2008 |
| TR | 2010/01870 A1 | 10/2011 |
| WO | 2011110965 A1 | 9/2011 |

OTHER PUBLICATIONS

International Search Report for corresponding PCT/TR2021/050643, dated Oct. 19, 2020.
Written Opinion of the International Searching Authority for corresponding PCT/TR2021/050643, dated Oct. 19, 2020.

*Primary Examiner* — Ian A Rummel
(74) *Attorney, Agent, or Firm* — EGBERT, MCDANIEL & SWARTZ, PLLC

(57) ABSTRACT

Disclosed is a moisture regulating ceramic material production method which includes the following process steps: mixing starting powders containing sepiolite and reactive alumina sulfate; grinding the starting powders; obtaining granules by dry granulation using alkaline solution with the starting powders; carrying out a pressing process of the granules; and obtaining the materials.

23 Claims, No Drawings

MOISTURE REGULATING MATERIAL AND PRODUCTION METHOD THEREOF

FIELD OF THE INVENTION

The present invention relates to a moisture regulating and antimicrobial/antibacterial ceramic material which can eliminate unwanted odors by regulating the ambient humidity used as a coating material on surfaces such as wall, ceiling etc. and to a production method thereof.

PRIOR ART

Moisture regulation in ceramic materials is to condense moisture into capillary pores on the material surface when the humidity in the air is high and is to release the condensed moisture into the air when the humidity in the air is low.

Sepiolite, which is one of the natural porous materials, is a clay mineral with adsorption-desorption properties due to its highly porous surface and large proportion of the pore volume consisting of pores below 50 mm. For this reason, natural sepiolite raw material individually exhibits high humidity. Natural sepiolite raw material individually exhibits high humidity control. It is necessary to give strength to the material so as to produce wall/ceiling tiles with moisture control property from sepiolite raw material. For this reason, heat treatment is applied at temperatures above 600° C.

In the patent document numbered U.S. Pat. No. 6,472,061, it is stated that sufficient strength is provided without losing the moisture control property of the sepiolet by mixing it with clay or glass binders after heat treatment at 650-850° C.

In the production of such tile, the energy requirement increases due to the high heat requirement, but also industrial wastes such as fly ashes are formed. In the patent numbered TR2010/01870, the production method of a material with moisture control feature that does not require heat treatment at high temperatures is described so as to solve this problem. In this method, it has become possible to manufacture a material that provides moisture control as well as having suitable strength for tile applications by pressing the sepiolite-density (50-90%) starting powders, then subjecting them to heat treatment at a suitable relative humidity, low temperature (between 25-250° C.), that is, by providing a geopolymerization environment.

The material produced with this application takes its moisture balancing and odor removal properties from its capillary/pore structure. Said structure gives a chance for microorganisms to adhere to the environment and reproduce in an environment where moisture exchange is regularly provided. This situation poses a major hygiene threat in the environments where the material is used.

As a result, all abovementioned problems have made it necessary to make an improvement in the relevant technical field.

AIM OF THE INVENTION

The present invention aims to eliminate the abovementioned problems and to make a development in the relevant technical field.

The main aim of the present invention is to provide a moisture regulating and antimicrobial/antibacterial ceramic material which can eliminate unwanted odors by regulating the ambient humidity used as a coating material on surfaces such as wall, ceiling etc. and can prevent microorganisms from being on the surface and a production method thereof.

Here, it is aimed to obtain a material that has antibacterial and microbial properties without decreasing or changing the ambient humidity control and strength values below the desired level.

BRIEF DESCRIPTION OF THE INVENTION

In order to achieve all the above-mentioned aims and which will emerge from the detailed description below, the present invention is a moisture regulating ceramic material production method which comprises the following process steps; mixing the starting powders containing sepiolite and reactive alumina sulfate; grinding of starting powders; obtaining granules by dry granulation using alkaline solution with starting powders; carrying out the pressing process of the granules; obtaining the materials. Accordingly, in the invention, the weight ratios of sepiolite, reactive alumina sulfate and alkaline solution between 4.5-7.5%, 26-29% and 54.5%-64%, respectively and is adding 3-10% boron-containing material by weight to the starting powder or alkali solution by dissolving it in alkali solution and geopolymerizing a structure obtained by pressing the granules at a temperature of 25-250° C., in an environment of at least 50% relative humidity, for a period of 2-24 hours.

In a preferred embodiment of the invention, the boron-containing substance is boric acid.

In another preferred embodiment of the invention, the weight ratio of said boron-containing substance is between 3-8%.

In a preferred embodiment of the invention, the weight ratio of said reactive alumina sulfate is between 27-29%.

In another preferred embodiment of the invention, the weight ratio of said sepiolite is between 6-7.5%.

In a preferred embodiment of the invention, the boron-containing substance is borax.

In another preferred embodiment of the invention, the weight ratio of said boron-containing substance is between 5-8%.

In a preferred embodiment of the invention, the weight ratio of said reactive alumina sulfate is between 26-27.25%.

In another preferred embodiment of the invention, the weight ratio of said sepiolite is between 4.5-6.75%.

In a preferred embodiment of the invention, said reactive alumina sulfate is metakaolin.

In another preferred embodiment of the invention, said alkaline solution contains caustic and waterglass.

In a preferred embodiment of the invention, said alkaline solution contains water.

In another preferred embodiment of the invention, said geopolymerization process is carried out in an environment with at least 80% relative humidity.

In a preferred embodiment of the invention, said geopolymerization process is carried out at a temperature between 125-175° C.

In another preferred embodiment of the invention, embossing process is applied to the obtained material.

In another preferred embodiment of the invention, coloring process is applied to the obtained material.

In another preferred embodiment of the invention, partial glazing process is applied to the obtained material.

In another preferred embodiment of the invention, said boron-containing substance is added to the starting powder in solid form or to the alkali solution in solid form.

In another preferred embodiment of the invention, said boron-containing substance is added to the alkaline solution by being dissolved in the alkaline solution.

In another preferred embodiment of the invention, said boron-containing substance is added to the starting powder in liquid form or to the alkaline solution in liquid form. The present invention is a moisture regulating ceramic material used as a wall and ceiling covering material produced with the production method in accordance with any of the claims 1-18 or the explanations given in the detailed explanation so as to fulfill all aims mentioned above and will be obtained from the following detailed description.

DETAILED DESCRIPTION OF THE INVENTION

In this detailed description, the inventive moisture regulating material and production method thereof is described by means of examples only for clarifying the subject matter such that no limiting effect is created.

The present invention relates to moisture regulating ceramic material which can eliminate unwanted odors by regulating the ambient humidity used as a coating material on surfaces such as wall, ceiling etc. and to a production method thereof.

In the inventive method, by using boron-containing substance in specific conditions and forms of the substance, it is provided that the material to be obtained with said method will gain antibacterial and microbial properties and that the properties of the material such as known moisture control and strength at the appropriate value are prevented from being seriously reduced or lost.

In the inventive moisture regulating material and production method, sepiolite and alumina silicate, which are the main moisture-regulating components, are used as the starting powders. Reactive alumina silicate, which can give a geopolymerization reaction, is mixed with natural sepiolite. Although amorphous alumina silicates such as meta-clays, fly ash, slag etc. can be used as alumina silicate, especially metakaolin is preferred.

Grinding and/or homogenization is carried out so as to bring the mixed powders to a certain size and to have the same powder in every part of the powder mixture.

Granules are obtained by dry granulation by using alkali solution with starting powders.

Boron-containing substance can be added to the formulation in several different ways before obtaining the granules.

In the first method, boron-containing substance is added directly to the starting powder containing sepiolite and reactive alumina silicate. Here, the boron-containing substance is solid. After the boron-containing substance is added, the mixture powder is ground and then it is homogenized optionally.

In another method, boron-containing substance powder mixture is added in liquid form.

In the second method, the boron-containing substance is added into the alkaline solution. Here, the boron-containing substance is also solid, but this solution must be dissolved in solution before being used in dry granulation.

In another method, the boron-containing substance is added into the alkaline solution in liquid form. In another method, boric acid and borax were added together in the alkali solution according to the ratio in the recipe.

Boric acid and borax are mixed with waterglass so as to prepare alkaline solution. Here, waterglass, boric acid, borax mixture is mixed for 10-15 minutes at an ambient temperature of 25-35° C. so as to ensure a homogeneous dispersion.

Boron derivatives were mixed for 10-15 minutes at an ambient temperature of 25-35° C. and homogeneously dispersed in waterglass.

Then, caustic was added to this mixture at the recipe ratio and mixed for 6-8 hours. Therefore, a boron-derived liquid mixture was obtained. Following this, the powder mixture was wetted with this alkaline solution.

In granulation, which is the process of granulation, after powder mixing grinding and homogenizing processes, the obtained mixture is both mixed by spraying alkali solution and also granules are obtained. Granules obtained after the process are screened through a 1 mm sieve.

When the total weights of the inputs used to obtain granules are considered; the weight ratios of sepiolite, reactive alumina sulfate, alkaline solution and boron-containing material are used between 4.5-7.5%, 26-29%, 54.5%-64% and 3-10%, respectively.

In the preparation of said alkali solution; preferably waterglass and caustic are used, but optionally water can also be used. Here, the ratio of caustic to total weight is between 4-7% by weight, between 48-51% of waterglass, and between 2.5-8% of water.

In an embodiment of the invention, boron-containing substance is boric acid. Here, the weight ratio of boric acid can vary between 3-8%. Preferably, 6% boric acid is used. The weight ratios of metakaolin, sepiolite and alkaline solution are in the range of 27-29%, 6-7.5% and 57.5-64%. Here, the weight ratios of caustic, waterglass and water in alkaline solution can be selected in the range of 4-7%, 49-51%, 2.5-8%, respectively.

In a preferred embodiment of the invention, the boron-containing substance is borax. Here, the weight ratio of borax can vary between 5-8%. The weight ratios of metakaolin, sepiolite and alkaline solution are in the range of 26-27.25%, 4.5-6.75% and 60.75%-63.25%, respectively. Here, the weight ratios of caustic, waterglass and water in alkaline solution can be chosen in the range of 6.5-7%, 48-49.5%, 4.75-6.75%, respectively.

Granules are kept in a closed environment for 1-2 hours for moisture homogenization. The kept granules are shaped with a dry press.

The samples, which are pressed from granular form to the desired dimensions and thus shaped, are exposed to heat treatment by keeping them at room temperature between 25° C. and maximum 250° C., in a minimum 50% relative humidity environment, for a period of 2-24 hours, in other words geopolymerization reaction occurs.

The optimum environment for the geopolymerization process is provided at a relative humidity of above 80%, between 125° C. and 175° C.

When the temperature increases during geopolymerization, the reaction time is shortened. Moisture regulating material is obtained after the geopolymerization process. The strength of these obtained materials is sufficiently high so as to use the same in applications.

Embossing is made on the surface so as to create a decorative effect in this moisture regulating product. In an embossing application of the inventive materials, the structure of the complete material can be colored by adding inorganic colorant (pigment) to the starting compositions depending on the desired color intensity.

Apart from this, only the surface can be colored by adding inorganic pigments to the geopolymer composition.

In another application of embossing, alkaline/alkaline earth alumina borosilicate frits, which mature at low temperatures, can be partially applied to the surfaces of the materials. Alkali/alkaline earth alumina borosilicate frits are sintered on the surfaces of the materials at a temperature of 650° C. After sintering, partially glazing is carried out on the surface. The glazing process is applied partially so as to cover the surface by approximately 70-90%. After the glaze application, heat treatment can be applied at 650° C. so as to melt the glaze and ensure its adhesion to the surface In the production of the inventive moisture regulating materials (10); unlike tile manufacturing processes known in the art, a ceramic moisture regulator material that can provide antibacterial and antimicrobial properties with the desired strength at low temperatures such as 25-250° C. is obtained by applying geopolymerization method.

During production, sepiolite provides moisture regulation property in the produced material. Geopolymers are ceramic-like materials formed as a result of alkali activation of reactive alumina silicates. Alkali activation is a process performed by mixing alumina silicate-based raw materials with alkali solutions prepared in certain stoichiometric ratios. The hardening reaction occurs by keeping the obtained sludge at a certain temperature and humidity-controlled environment. The reaction product formed in the specified system is a three-dimensional and gel-like amorphous alumina silicate mineral. The material, which is formed depending on the raw material selection and process conditions, shows high compressive strength, high acid resistance, high heat resistance and low thermal conductivity.

In the inventive production method (10), metakaolin is preferably used as a source of alumina silicate, the mole ratios of the oxides in the structure of the material in geopolymerization are: $SiO_2/A_2O_3$:2-8, $Na_2O+K_2O/SiO_2$: 0.20-0.50, $H_2O/Na_2O+K_2O$: 11-18, $(Na_2O, K_2O)/Al_2O_3$:1-1.5. In the method, the specified molar ratios are prepared depending on the amount of metakaolin in the composition and the reactive alumina silica ratios in the metakaolin by considering that the reactive silicon and aluminum in the composition come from metakaolin.

The disc diffusion test was applied to the ceramic material obtained by the inventive method so as to determine the antimicrobial activity. The tests were carried out according to the Japanese Industrial Standard.

In the disc diffusion test, *Staphylococcus aureus, Pseudomonas aeruginosa* and *Escherichia coli* organisms stored in −80° C. stock were first inoculated by scratching on LB agar and incubated for 16 hours at 37° C. Selection was made from the formed colonies and incubated again in liquid LB. The OD values of cells grown for 16 hours were measured and diluted to a final cell count of $10^9$. 100 ml of $10^9$ cells were taken and inoculated on LB agar by spreading and finally, the material was placed on the agar plate on which the cell was spread and incubated for 16 hours at 37° C. for antimicrobial analysis. The incubation phase was carried out at different moisture percentages due to the moisture-retaining property of the geopolymer material (30-35%, 40-45%, 50-55%). The results obtained were evaluated according to the zone formation (active antimicrobial zone) around the material.

Firstly, disc diffusion tests of powder geopolymer materials containing 0.5%, 1% and 2% boric acid and 0.5%, 1% and 2% borax were carried out. As a result of the analysis, no zone formation was observed.

Then, the material containing 4%, 6%, 8% and 10% borax or boric acid was tested separately for embodiments in which borax and boric acid were used both as liquid and as solid.

Geopolymer materials obtained by adding borax in liquid form at 4%, 6%, 8% and 10% concentrations were prepared as powder and mold samples. Disc diffusion test was performed with 100 mg of powder material. As a result of disc diffusion analyses, zone formations were observed from 6% concentration for *P. aeruginosa* and *S. aureus*, and from 8% concentration for *E. coli*.

Besides, geopolymer samples containing 6%, 8% and 10% solid borax, 6%, 8% and 10% solid boric acid and 6%, 8% and 10% liquid boric acid were prepared. Antimicrobial activity of these samples was tested in hospital infection microorganisms such as *E. coli, S. aureus* and *P. aeruginosa*. All studies were carried out at 37° C. and 30-35% humidity.

In the test for *E. coli*, low zone formations were observed in the solidly added sample with 6% boric acid concentration, improvements were observed in the zone formation as the concentration increased towards 10%. In the sample with boric acid concentration added in liquid form, good zone formation was observed from 6%. No significant activity is observed for borax containing samples.

In the test carried out for *S. aureus*, low zone formation was observed at 8% and 10% for borax. Besides, low zone formations were observed in the solidly added sample with 6% and 8% boric acid concentration, improvements were observed in the zone formation as the concentration increased towards 10%. In the sample with boric acid concentration added in liquid form, good zone formation was observed from 6%.

In the test carried out for *P. Aeruginosa*, low zone formations were observed in the solidly added sample with 6% boric acid concentration, improvements were observed in the zone formation as the concentration increased towards 10%. In the sample with boric acid concentration added in liquid form, good zone formation was observed from 6%.

It was seen that the use of boron-containing material, especially boric acid, in liquid form is advantageous in terms of antimicrobial properties.

Moisture holding tests were carried out for samples to which 6%, 8% and 10% boron-containing substance is added and values varying in the ranges of 1.44-1.65 g/cm3, 1.47-1.66 g/cm3 and 1.40-1.66 g/cm3 were obtained, respectively.

In the resistance tests, resistance values varying between 3.5-5.1 N/mm2 were observed in the samples to which 6%, 8% and 10% boron containing material was added. The water absorption rates in said samples vary between 25-27%.

The protection scope of the invention is specified in the appended claims and cannot be limited to the description made for illustrative purposes in this detailed description. Likewise, it is clear that a person skilled in the art can present similar embodiments in the light of the above descriptions without departing from the main theme of the invention.

The invention claimed is:

1. A method for producing a moisture-regulating ceramic material, the method comprising:

mixing a sepiolite and a reactive alumina silicate to form a starting powder;

grinding the starting powder;

adding an alkaline solution to the starting powder;

obtaining granules by dry granulation of the alkaline-added starting powder;

pressing the obtained granules, wherein a weight ratio of the sepiolite and the reactive alumina silicate and the alkaline solution are between 4.5% to 7.5% and 26% to 29% and 54.5% to 64%, respectively;

adding 3% to 10% by weight of the boron-containing material to the starting powder or alkaline solution; and geopolymerizing a structure obtained by the pressing of the granules at a temperature of between 25° C. and 250° C. in an environment of at least 50% humidity for a period of time of between two hours and twenty-four hours.

2. The method of claim 1, wherein the boron-containing material is boric acid.

3. The method of claim 2, wherein the boric acid has a weight ratio of between 3% and 8%.

4. The method of claim 2, wherein the weight ratio of the reactive alumina silicate is between 27% and 29%.

5. The method of claim 2, wherein the weight ratio of the sepiolite is between 6% and 7.5%.

6. The method of claim 1, wherein the boron-containing material is borax.

7. The method of claim 6, wherein the ratio of the borax is between 5% and 8%.

8. The method of claim 6, wherein the weight ratio of the reactive alumina silicate is between 26% and 27.25%.

9. The method of claim 6, wherein the weight ratio of the sepiolite is between 4.5% and 6.75%.

10. The method of claim 1, wherein the boron-containing material is a mixture of boric acid and borax.

11. The method of claim 10, wherein the mixture is mixed with waterglass at an ambient temperature of between 25° C. and 35° C. for between ten minutes and fifteen minutes.

12. The method of claim 1, wherein the reactive alumina silicate is metakaolin.

13. The method of claim 1, wherein the alkaline solution contains a caustic and a waterglass.

14. The method of claim 13, wherein the alkaline solution contains water.

15. The method of claim 1, wherein the step of geopolymerization is carried out in the environment of at least 80% humidity.

16. The method of claim 1, wherein the step of geopolymerization is carried out at a temperature of between 125° C. and 175° C.

17. The method of claim 1, further comprising:
embossing the moisture regulating ceramic material.

18. The method of claim 1, further comprising:
coloring the moisture regulating ceramic material.

19. The method of claim 1, further comprising:
partially glazing the moisture regulating ceramic material.

20. The method of claim 1, wherein the boron-containing material is added to the starting powder is solid form.

21. The method of claim 1, wherein the boron-containing material is added to the alkaline solution in liquid form.

22. The method of claim 21, wherein the boron-containing material is added to the alkaline solution by being dissolved in the alkaline solution.

23. The method of claim 1, wherein the boron-containing solution is added to the starting powder or to the alkaline solution in a fluid form.

* * * * *